(12) United States Patent
Pallado et al.

(10) Patent No.: US 7,087,745 B1
(45) Date of Patent: Aug. 8, 2006

(54) THREE-DIMENSIONAL STRUCTURES CONTAINING HYALURONIC ACID DERIVATIVES OBTAINED BY THE SUPERCRITICAL ANTISOLVENT TECHNIQUE

(75) Inventors: Paolo Pallado, Abano Terme (IT); Marco Baggio, Abano Terme (IT); Maurizio Dalle Carbonare, Abano Terme (IT); Lanfranco Callegaro, Abano Terme (IT)

(73) Assignee: Fidia Farmaceutici S.p.A., Padua (IT)

( * ) Notice: Subject to any disclaimer, the term of this patent is extended or adjusted under 35 U.S.C. 154(b) by 0 days.

(21) Appl. No.: 09/958,144

(22) PCT Filed: Apr. 6, 2000

(86) PCT No.: PCT/EP00/03081

§ 371 (c)(1),
(2), (4) Date: Nov. 14, 2001

(87) PCT Pub. No.: WO00/61675

PCT Pub. Date: Oct. 19, 2000

(30) Foreign Application Priority Data

Apr. 8, 1999 (IT) .......................... PD99A0071

(51) Int. Cl.
*C08B 37/08* (2006.01)
*A61K 31/728* (2006.01)

(52) U.S. Cl. .................. 536/55.2; 536/123.1; 536/124; 424/443; 514/62

(58) Field of Classification Search ............... 536/55.2, 536/55.3, 123.1, 124; 424/443; 514/62
See application file for complete search history.

(56) References Cited

U.S. PATENT DOCUMENTS

| | | | |
|---|---|---|---|
| 4,851,521 A | 7/1989 | della Valle et al. | |
| 4,957,744 A | 9/1990 | della Valle et al. | |
| 4,965,353 A | 10/1990 | della Valle et al. | |
| 5,013,724 A | 5/1991 | Petitou et al. | |
| 5,240,710 A | 8/1993 | Bar-Shalom et al. | |
| 5,520,916 A | * | 5/1996 | Dorigatti et al. |
| 5,646,129 A | 7/1997 | Callegaro et al. | |
| 5,676,964 A | 10/1997 | della Valle et al. | |
| 5,833,891 A | 11/1998 | Subranmamiam et al. | |
| 6,214,384 B1 | 4/2001 | Pallado et al. | |

FOREIGN PATENT DOCUMENTS

| | | |
|---|---|---|
| AU | 5204579 | 5/1980 |
| EP | 0 011 322 A1 | 5/1980 |
| EP | 0 138 572 B1 | 4/1985 |
| EP | 0 216 453 B1 | 4/1987 |
| EP | 0 342 557 A1 | 11/1989 |
| EP | 0 535 200 B1 | 4/1993 |
| WO | WO 89/07932 | 8/1989 |
| WO | WO 95/25751 | 9/1995 |
| WO | WO 96/29998 | 10/1996 |
| WO | WO 98/08876 | 5/1998 |
| WO | WO 98/45335 | 10/1998 |

OTHER PUBLICATIONS

Aigner, J. et al., L.Biomed. Mat. Res., vol. 42, pp. 172–181, 1998.

Weigel, Paul H. et al., J. Theor. Biol., vol. 119, pp. 219–234, 1986.

Luca Benedetti et al.: "Production of micronic particles of biocompatible polymer using supercritical carbon dioxide" Biotechnology and Bioengeneering, vol. 53, 1997, pp. 232–237, XP000929895.

* cited by examiner

*Primary Examiner*—Samuel Barts
*Assistant Examiner*—Michael C. Henry (57) ABSTRACT

Biocompatible and biodegradable, three-dimensional structures containing hyaluronic acid derivatives, obtained by the technique of precipitation induced by supercritical antisolvent (SAS), can be used in the field of medicine and surgery.

20 Claims, 4 Drawing Sheets

THREE-DIMENSIONAL STRUCTURES CONTAINING HYALURONIC ACID DERIVATIVES OBTAINED BY THE SUPERCRITICAL ANTISOLVENT TECHNIQUE

This application is the national phase under 35 U.S.C. §371 of PCT International Application No. PCT/EP00/03081 which has an International filing date of Apr. 6, 2000, which designated the United States of America and was published in English.

FIELD OF THE INVENTION

The present invention relates to:

microspheres having a diameter $\geq 0.1$ and $<1\mu$, comprising a biocompatible polysaccharide polymer and optionally at least one active ingredient.

pharmaceutical compositions containing said microspheres administrable by oral, nasal, pulmonary, vaginal or rectal route, the use of microspheres having a diameter ranging from 0.1 to $1\mu$ as carriers for the preparation of pharmaceutical compositions for human genic therapy, for the preparation of diagnostics and in the agroalimentary industry, a process for the preparation of microspheres having a dimension of between 0.1 and $1\mu$ comprising the precipitation of said polymer induced by means of a supercritical antisolvent (SAS).

TECHNOLOGICAL BACKGROUND

Major advances have recently been made in pharmaceutical technology to research new methods for the preservation of the intrinsic activity of polypeptides and to render them absorbent. Formulations able to ensure a reproducible absorption of these active molecules have the advantage of lacking side effects, unlike synthetic polymers. Of all the most widely used natural polymers the category of acidic polysaccharides is of particular interest. One of these, hyaluronic acid, a polysaccharide widely distributed throughout animal organisms, is constituted by units of D-glucuronic acid and N-acetyl D-glucosamine in alternate order. Its molecular weight can vary according to the methods used for its extraction and/or purification (EP 0138572 reg. on Jul. 25, 1990; EPA 0535200 published on Apr. 7, 1993; PCT Application Ser. No. WO 95/04132 published on Feb. 9, 1995; PCT Patent Application Ser. No. WO 95/24497 published on Sep. 9, 1995).

Besides the polymer's chemical-physical properties, the release methods and systems for biologically active molecules are also particularly important, such as microspheres which seem to be among the most versatile release systems. EPA 0517565 discloses a process for the preparation of microspheres, whose dimensions range between 1–100 μm, wherein the polysaccharide ester dissolved in an aprotic solvent such as DMSO, is added to a mixture of a high-viscosity mineral oil containing a non ionic surface active agent and ethyl acetate, which is a solvent for DMSO and the mineral oil, but not for the polysaccharide ester, which therefore precipitates in the form of microspheres having therefore the above mentioned dimensions.

Today, various techniques are known which involve the use of supercritical fluids for the production of finely subdivided particles with a narrow granulometric distribution curve. The supercritical antisolvent process is generally performed at moderate temperatures and enables the solvent to be completely removed from the precipitation environment. The applications concern substances that are heat-sensitive or difficult to handle, such as explosives (Gallagher. P. M. et al. 1989, *Supercritical Fluid Science and Technology*—Am. Chem. Soc. 334–354). Other applications concern the production of polymers in the form of fibers (Dixon, D. J. et al, 1993, *J. Appl. Polym. Sci.* 50, 1929–1942) and in the form of microparticles, including microspheres (Dixon, D. J., et al., 1993, *AIChE J.*, 39, 1, pp 127–139). In the pharmaceutical field, the main interest is in the treatment of proteins (Tom, J. W., et al. 1994, *Supercritical Fluid Engineering Science*, pp 238–257, ACS Symp. Chap. 19, Ed. H. Kiran and J. F. Brennecke; Yeo, S. D., et al, 1993, *Biotech, and Bioeng.*, 41, pp 341–346) and biodegradable polymers, such as poly(L-lactic acid) (Randolph, T. W., et al. 1993, *Biotechnol. Prog.*, 9, 429–435; Yeo, S. D., et al, 1993, *Macromolecules*, 26, 6207–6210). Various methods have been devised for precipitation with a supercritical antisolvent. The semi-discontinuous method (Gallagher et al., 1989), involves injection of the antisolvent in the liquid solution which has already been prepared in the desired working conditions. The operation must be performed in a stepwise fashion to ensure that the liquid is removed, the final quantities of product are very limited and the spheres measure far more than $1\mu$ in size.

Precipitation with a compressed antisolvent (PCA) involves injection of the solution in the high-density supercritical fluid (SCF) (Dixon et al., 1991; Dixon and Johnston, 1993). The injection times are much reduced to guarantee complete dissolution of the liquid, so the quantity of precipitate is very low, giving microfibers with an ordered structure.

The continuous process (Yeo et al., 1993a) enables the solution and the antisolvent to be injected simultaneously in the precipitation environment; the liquid expands and evaporates in the continuous phase, constituted by the SCF. The solution is injected through a micrometric nozzle with a diameter ranging between 10 and 30 μ. Solutions must be diluted to avoid blocking the nozzle and to prevent reticulate structures being formed. Consequently, the quantity of solid solute injected is very low. Moreover, a high ratio between the volume of antisolvent and solution must be used to continuously remove the liquid solvent from the precipitation vessel.

When the solution is placed in the precipitator and the container is loaded by means of SCF up to the desired pressure, the process assumes a completely discontinuous character (Yeo et al., 1993 a,b). By this technique, microspheres with a diameter of over 1 μ have been obtained. All the methods described here are accompanied by a final washing step to prevent the precipitate being resolubilized by the solvent. However, none of the cited techniques has been specifically applied to the production of high-molecular-weight biocompatible polysaccharide polymers and in particular the HYAFFs, namely the ester of hyaluronic acid, which are obtained by the procedure described in U.S. Pat. No. 4,851,521.

SUMMARY OF THE INVENTION

The Applicant has unexpectedly found that with the discontinuous SAS technique it is possible to obtain in quantitative yields microspheres with a diameter of less than $1\mu$ comprising a polysaccharide biocompatible polymer.

Object of the present invention are therefore microspheres having a dimension a $\geq 0.1\mu$ and $<1\mu$ comprising a biocompatible polysaccharide polymer.

A further object of the present invention are pharmaceutical compositions administrable by oral, nasal, pulmonary, vaginal or rectal route, containing said microspheres as vehicling agents or carriers in combination with at least one active ingredient and optionally with further conventional excipients.

A further object of the present invention relates to said microspheres further comprising at least one of the following active principles: a pharmaceutically active polypeptide, a Granulocyte Macrofage Colony Stimulating Factor (GMCSF), a trophic factor, an immunoglobulin, a natural or a synthetic derivative of a ganglioside, an antiviral, an antiasthmatic an antiinflammatory agent, an antibiotic and an antimycotic agent.

A further object of the present invention relates to pharmaceutical compositions administrable by oral, nasal, pulmonary, vaginal or rectal route containing the microspheres inglobating the above mentioned active principles, optionally in combination with other conventional excipients.

A further object of the present invention relates to the use of microspheres having a diameter comprised between 0.1 and 1μ as carriers in the preparation of diagnostics and in agroalimentary industry. Moreover they can be advantageously used as vehicling agent or carriers of a gene, for the preparation of pharmaceutical compositions for the treatment of diseases associated with genic defects.

A further object of the present invention resides in the discontinuous process for the preparation of microspheres having a dimension comprised between 0.1 and 1μ and comprising the precipitation of said polymer induced by means of a supercritical antisolvent (SAS).

The process object of the present invention comprises the following steps:

a) dissolving the polysaccharide biocompatible polymer in an aprotic solvent at concentrations ranging from 0.1 to 5% by weight.

b) charging the solution of step (a) in a pressure proof container having at the top and at the base steel filters with an average cut-off lower than 0.1 μ;

c) loading from underneath the antisolvent until reaching the pressure at which said fluid becomes supercritical at a temperature ranging from 25 to 60° C., d) removing the aprotic solvent, by flowing said supercritical fluid, e) depressurizing the pressure proof container and collecting the precipitated product.

Contrarily to what one could foresee from the above mentioned prior art (teaching that, with the SAS discontinuous technique, process times are longer than with the continuous one, nucleation occurs in the bulk liquid phase where the supercritical antisolvent is dissolved and therefore the formation of large particles with broad granulometric distribution is expected), surprisingly the expanding conditions adopted with the process according to the present invention enable the onset of the nucleation process in a well-expanded media so that the formation of a high number of nucleation centres is achieved. This factor, combined with the amorphous nature of the solid solute, leads to the formation of microspheres whose dimension is comprised in the above mentioned range and moreover with a narrow granulometric distribution curve.

DETAILED DESCRIPTION OF THE INVENTION

The biocompatible polysaccharide polymer which is comprised in the microspheres according to the present invention is preferably an ester of a polysaccharide acid such a hyaluronic acid ester, selected from those described in U.S. Pat. No. 4,851,521, which we incorporate by reference, a crosslinked ester of hyaluronic acid selected from those disclosed in EP 0341745 B1 which we incorporate by reference, an ester of chitin selected from those described in PCT WO93/06136, which we incorporate by reference, an ester of pectin selected from those mentioned in PCT WO93/14129, which we incorporate by reference, an ester of gellan selected from those disclosed in U.S. Pat. No. 5,332,809, which we incorporate by reference, an ester of alginic acid selected from those reported in U.S. Pat. Nos. 5,264,422 and 5,336,668, which we incorporate by reference. Particularly preferred esters are the total or partial benzyl ester of hyaluronic acid. Among the partial ester a particularly preferred ester is the benzyl ester with 75% of the carboxy function of hyaluronic acid esterified with benzyl alcohol.

The pharmaceutical compositions according to the present invention containing said microspheres as vehicling agents or carriers, in combination with at least one active agent can optionally be formulated in a controlled release form, in order to have the desired rate of absorption, with suitable excipients normally used for preparing this type of formulations.

Preferred pharmaceutically active polypeptides which can be comprised in the microspheres according to the present invention are calcitonin, insulin, preferred trophic factors, which can be incorporated in the microspheres according to the present invention are the Nerve Growth Factor (h-NGF), the Ciliary Neuronotrophic Growth Factor (h-CNTF).

The pharmaceutical compositions containing the above microspheres incorporating the above listed active principles, can optionally be formulated in controlled release form, in order to have the desired rate of absorption, with suitable excipients normally used for preparing this type of formulations.

As pointed out above the microspheres having a diameter ranging from 0.1 to 1μ can be advantageously used as vehicling agents in the diagnostic sector. In particular, according to the type of technique to be used for diagnostic analysis, such as NMR, ultrasound, X rays, the microspheres can be loaded with paramagnetic agents such as magnetite, or they may be concave in structure, or, alternatively, they may be loaded with nonionic contrast agents, or, lastly, with radioactive isotopes such as $TC^{99m}$.

As a matter of fact vehicling of the contrast agents by means of microspheres limits interaction with the blood, thus reducing the onset of the side effects typically caused by contrast agents.

As previously pointed out, another important sector in which the microspheres having a diameter comprised between 0.1 and 1μ according to the present invention can be advantageously used is the preparation of pharmaceutical compositions for the treatment of diseases associated with genic defects.

Much effort is currently being put into scientific research in this field to find remedies for genetic-type malformations or metabolic diseases of a genetic origin. Most of the work being done is aimed at identifying and preparing vehicling systems for healthy genetic material to be administered to patients suffering from such malformations and diseases. One of the possibilities is represented by the encapsulation of healthy genes in microspheres which are able to penetrate more deeply into the tissues and sustain contact with the cell surfaces to be treated for longer periods of time. It follows that the adherence of the microspheres to the cell surfaces enables the release of genetic material transported to the close vicinity of the target cells. In particular, the microspheres having a diameter ranging from 0.1 to 1μ containing the biocompatible polysaccharide polymer according to the present invention represent an ideal transport system for biological material, and in this particular case for healthy genes, thanks to their very small dimensions and specific mucoadhesiveness. Among the possible applications for said microspheres in the treatment of human diseases associated with genic defects a preferred one is in their use as vehicling agents of single genes which encode specific enzymes, for the treatment of diseases caused by a deficit of the same enzymes. There are in fact numerous diseases which derive from an enzyme deficit or hyperactivity, which is caused by defects occurred in the specific gene encoding this enzyme.

For example diseases of this type are:

phenylketonuria, due to a deficit of phenylalanine hydroxylase, alkaptonuria, due to a deficit of homogentisic acid oxidase, albinism due to a deficit of tyrosinase and many other diseases involving amino acid metabolism;

diseases involving glycogen accumulation, some of which are fatal at birth, due to deficit of enzymes such as glucose-6-phosphatase, brancher or de-brancher enzymes, and α-lysosomal glucosidase enzymes;

carbohydrate metabolism disorders

Wilson's disease, involving a defect in ceruloplasma, the protein which transports copper porphyria caused by a deficit in porphobilinogen deaminase, uroporphyrinogen oxydase, protoporphyrinogen oxydase coproporphyrinogen oxydase, gout due to hypoxanthine-guanine-phosphoribosyl transferase deficiency, or hyperactivity of 5-phosphoribosyl-1-pyrophosphate transferase, diseases involving lysosomal accumulation such as gangliosidosis, due to β-galactosidase deficiency, leukodystrophy, Niemann-Pick's disease due to sphingomyelinase deficiency, Gaucher's disease due to glucosyl-ceramidase deficiency, Fabry's disease, due to α-galactosidase deficiency, mucopolysaccharidosis etc., connective tissue disorders (brittle bone syndrome, Ehlers-Danlos syndrome, Marfan syndrome).

Besides their use in enzymatic deficits, the microspheres can be used to vehicle single genes in any pathologies wherein such genes are altered, such as malformative diseases of genetic origin (Down's syndrome, arachnodactyly etc.), hereditary diseases such as:

hemoglobinopathies (sickle-cell anaemia, thalassaemia etc), cystic fibrosis, primitive hyperlipoproteinemia and other lipid metabolism disorders, wherein single or multifactorial gene disorders with hereditary transmission and complex modalities of different genes, interact with environmental factors, thus determining hyperlipoproteinemia having a different degree of seriousness in different members of the same family, cancer wherein it has been ascertained that genetic alterations exist at the level of the differentiation and of the failed control of cellular growth.

Finally as pointed out above, the microspheres having a diameter of from 0.1 to 1μ can be advantageously used in the agro-alimentary sector, for example as a vehicle for plant treatments or for the preservation of additives.

The preferred supercritical fluid used as antisolvent in the process according to the present invention is selected from carbon dioxide ($CO_2$) and hydrofluorocarbons, such as trifluoromethane.

In this specific case when $CO_2$ in step (c) it is charged with a loading rate or pressure gradient ranging from 3 to 20 bar/min, preferably 10 bar/min, until a pressure is reached in the pressure proof container ranging from 80 to 120 bar/min, more preferably 100 bar/min.

Precipitation of the polymer in this step is induced by the supercritical antisolvent which, by solubilizing and expanding the solution, causes a decrease in the solvent power of the liquid and simultaneous evaporation. The dissolved product, not soluble in the SCF, separates as a solid.

The particles in step (d) are washed with the antisolvent to remove the liquid completely before the precipitator is depressurized.

The depressurization in step (e) of the process according to the present invention is preferably carried out by using a pressure gradient of 5 bar/min.

The preferred solvent used in step (a) to dissolve the biocompatible polysaccharide polymer is selected from dimethylsulfoxide and N-methylpyrrolidone.

The microspheres according to the present invention further comprising at least one of the above mentioned active principles can be prepared in two alternative ways.

The first one encompasses the addition of the active principle in step (a) of the process according to the present invention, after the dissolution of the biocompatible polysaccharide polymer in the aprotic solvent.

The coprecipitation of the active principle in step (c) with the biocompatible polysaccharide polymer does not alter the form or morphology of the precipitate.

According to the latter way, the microspheres coming from step (e), are suspended in a buffered solution preferably a phosphate buffer solution containing the desired active principle at a suitable concentration in order to obtain the desired active ingredient titer/mg of microsphere, and the suspension is subjected to liophylization at the liquid nitrogen temperature.

We report hereafter, for purely illustrative purposes, some examples of how to obtain microspheres made with polymer alone or with polymer containing pharmacologically active substances. Any variations which would be obvious to an expert in the field are to be considered as coming within the scope of the present invention.

EXAMPLE 1

Preparation of Microspheres Wherein the Starting Polymer is HYAFF-11 (Benzyl Ester of Hyaluronic Acid)

A hyaluronic acid ester, wherein all the carboxy groups of hyaluronic acid are esterified with benzyl alcohol, is dissolved in an aprotic solvent, such as dimethylsulfoxide (DMSO), at a concentration varying between 0.1 and 5% in weight, generally 1% w/w. Once the polymer has solubilized, the solution is poured into a pressure-proof container (precipitator), thermostatically controlled with a heated ethylene glycol jacket. Porous steel filters with an average cut-off of less than 0.1 μ are screwed onto the base and top of the precipitator.

The liquid is unable to seep through by gravity alone.

Once the container is closed, it is loaded from underneath with hyperpure carbon dioxide ($CO_2$) until the working pressure is reached (80–120 bar, preferably 100 bar). The $CO_2$ is dispersed in the solution through the filter. This antisolvent, which is first gaseous and then supercritical, can be mixed perfectly with the liquid solvent (DMSO) but it is a nonsolvent for the polymer.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure: the DMSO separates after expansion and consequent cooling, while the gaseous $CO_2$ comes out of the top of the container and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution an antisolvent flow rate are set up.

At the end of washing, the supply of $CO_2$ is cut off and the container is depressurized at a rate of 5 bar/min. The container is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 0.6μ (FIG. 12).

EXAMPLE 2

Preparation of Microspheres Wherein the Starting Polymer is HYAFF-11 p75 (Partial Benzyl Ester of Hyaluronic Acid)

A hyaluronic acid ester, wherein 75% of the carboxy groups of hyaluronic acid are esterified with benzyl alcohol, while the remaining part is salified with sodium, is dissolved in an aprotic solvent such as dimethylsulfoxide (DMSO), at a concentration varying between 0.1 and 5% in weight, generally 1% w/w. Once the polymer has reached solubilization, the solution is poured into a pressure-proof container (precipitator), thermostatically controlled by a heated ethylene glycol jacket. Porous steel filters with a cut-off of 0.1μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous filter. This antisolvent, which is first gaseous and then supercritical, can be mixed perfectly with the liquid solvent (DMSO) but it is a nonsolvent for the polymer.

The loading rate, or the pressure gradient over time, is set in a range of 3–20 bar/min, preferably 10 bar/min. The temperature in the precipitator is kept constant in a range of between 25° C. and 60° C. preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is dispersed in the atmosphere. The solid particles, on the other hand, are trapped by the porous filters at the top and bottom of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

Figure 1:
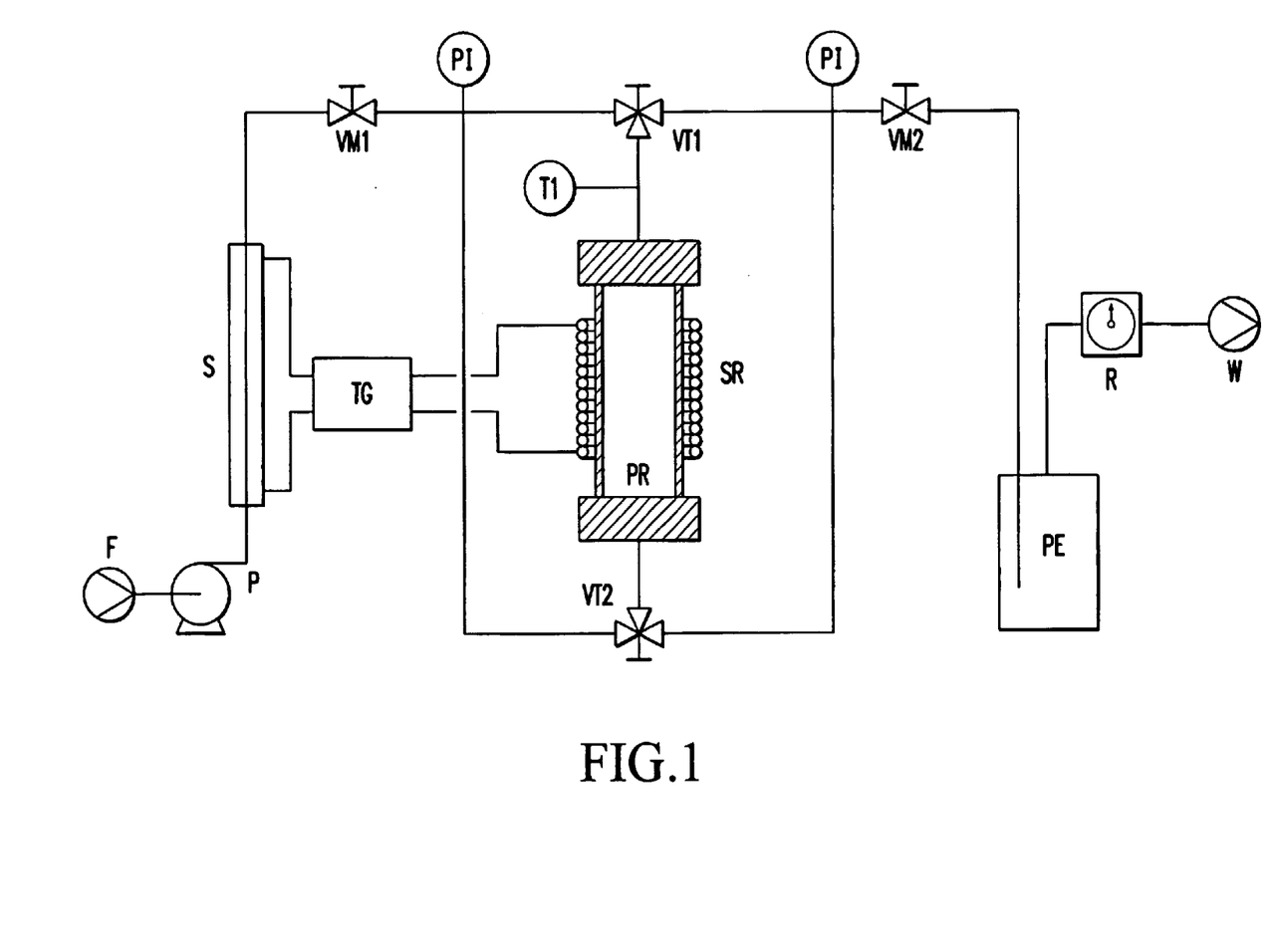
FIG. 1 is a diagram of the conduction line system for the SAS batch technique in tests for the production of network structures. F = supply of $CO_2$; P = plunger piston pump; S = superheater; TG = heating glycol thermostat; VM1, VM2 = millimetric adjustment valves; VT1, VT2 = three-way valves; PR = precipitator; SR = heating coil; PE = post-expansion vessel; R = rotameter; W = waste.
Figure 2:
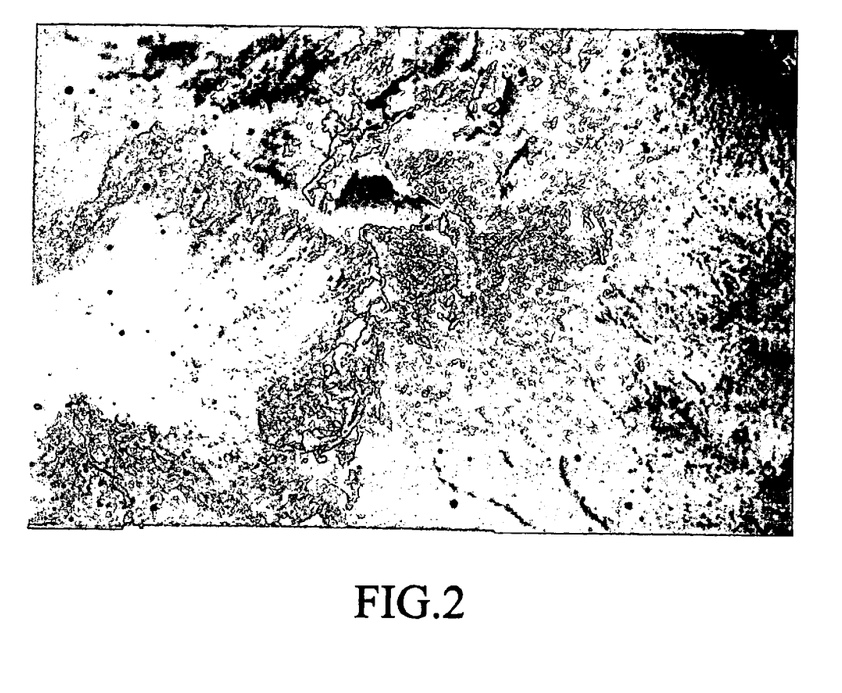
FIG. 2 is a SEM photograph of a specimen of Hyaff-11 obtained in test 4 by the SAS batch technique conducted at 40° C. starting from a 10% by weight solution in DMSO. (bar=1 mm × 55).
Figure 3:
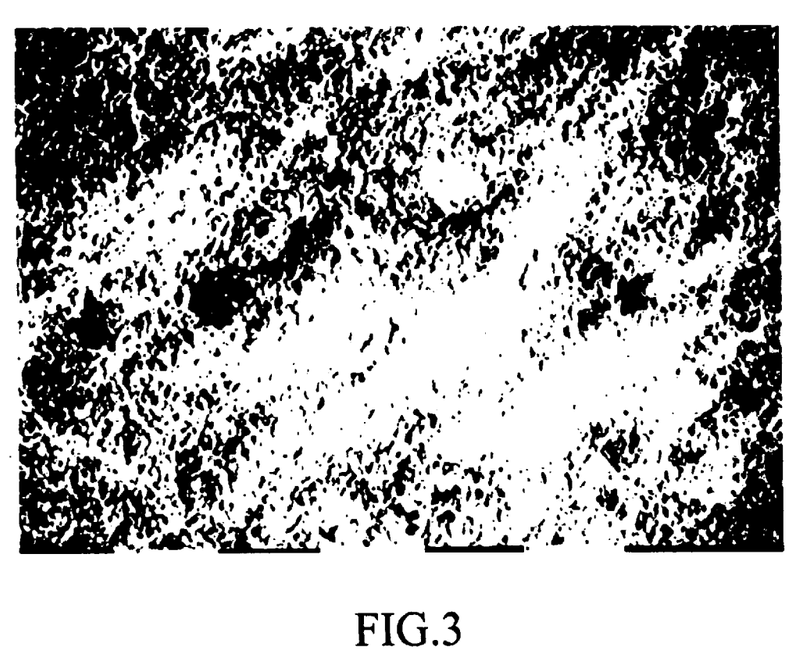
FIG. 3 is a SEM photograph of a specimen of Hyaff-11 obtained in test 4 by the SAS batch technique conducted at 40° C. starting with a 10% by weight solution of DMSO. (bar = 100 82 m ×1490).

The mean particle size in these working conditions is 0.8 μ (FIG. 3).

EXAMPLE 3

Preparation of Microspheres wherein the Starting Polymer is HYAFF-7 (Ethyl Ester of Hyaluronic Acid)

A hyaluronic acid ester, wherein all the carboxy groups of hyaluronic acid are esterified with ethyl alcohol, is dissolved in an aprotic solvent such as dimethylsulfoxide (DMSO), at a concentration varying between 0.1 and 5% in weight, generally 1% w/w. Once the polymer has reached solubilization, the solution is poured into a pressure-proof vessel (precipitator), thermostatically controlled by a heated ethylene glycol jacket. Porous steel filters with a cut-off of $0.1\mu$ are screwed onto the top and bottom of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base. This antisolvent, which is first gaseous and then supercritical, can be mixed perfectly with the liquid solvent (DMSO) but it is a nonsolvent for the polymer.

The loading rate, or the pressure gradient over time, is set in a range of 3–20 bar/min, preferably 10 bar/min. The temperature in the precipitator is kept constant in a range of between 25° C. and 60° C. preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

Figure 4:
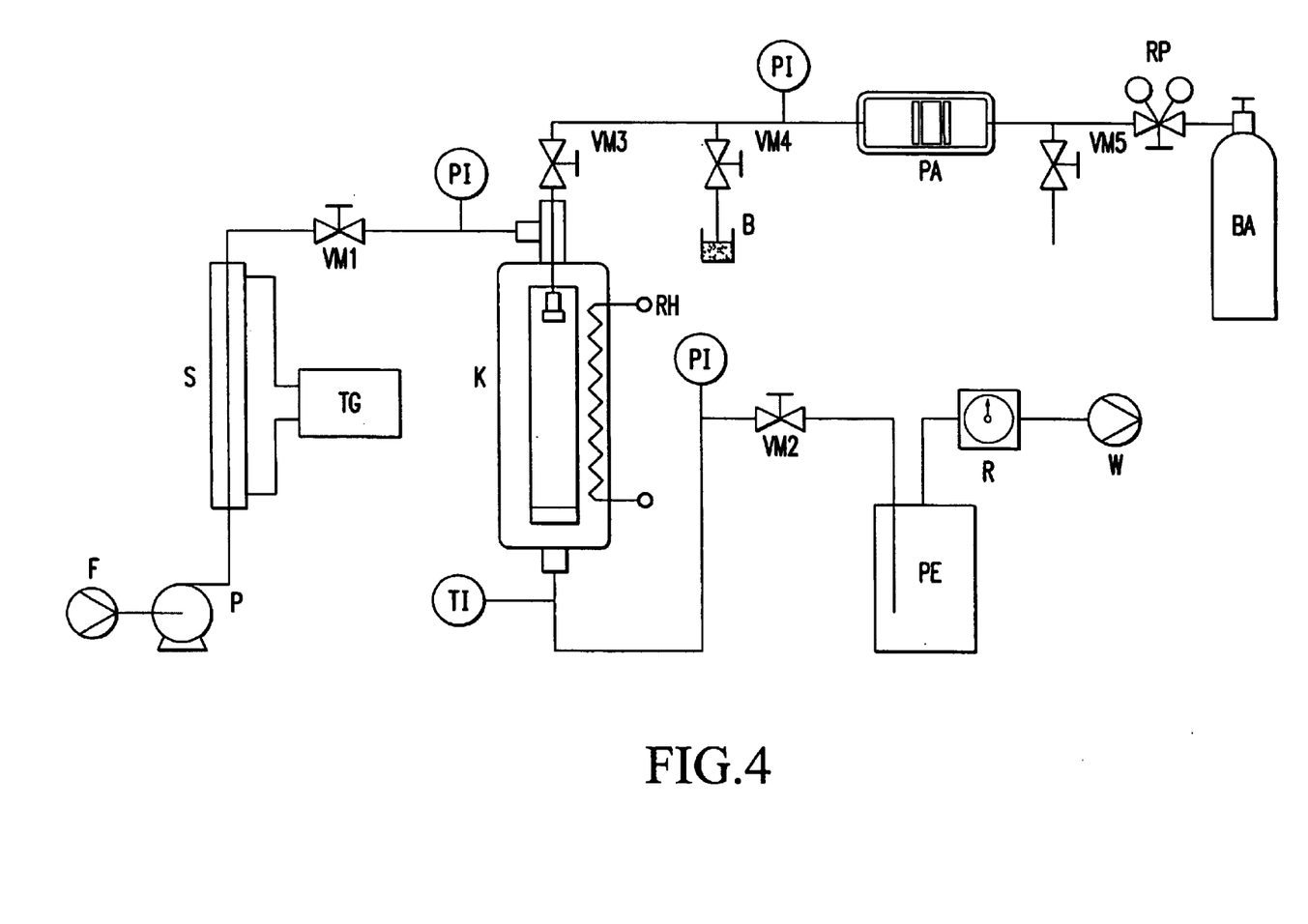
FIG. 4 is a diagram of the system for the production of threads of Hyaff by the use of the continuous SAS technique using a cell with a window (solution 2). F = supply; P = plunger piston pumps S = superheater; TH = glycol thermostatic heater; VM1, VM2, VM3, VM4, VM5 = millimetric adjustment valves; K = cell with window; RH = heating coil; TI = thermometer; PI = manometer; BA = drum of air at 200 bar; RP = pressure reducer; PA = continuous water-driven injection system; B = container for collection of the solution; PE = post-expansion vessel; R = rotameter; W = waste.

The mean particle size in these working conditions is $1.0\mu$ (FIG. 4).

EXAMPLE 4

Preparation of Microspheres Wherein the Starting Polymer is a Crosslinked Polysaccharide of Hyaluronic Acid (ACP)

A hyaluronic acid derivative, wherein 10% of the carboxy groups of hyaluronic acid are bound with inter- or intramolecular hydroxy groups and the remaining part is salified with sodium, is dissolved in an aprotic solvent such as dimethylsulfoxide (DMSO), at a concentration varying between 0.1 and 5% in weight, generally 1% w/w. The procedure described in Example 1 is then performed. The mean particle size is $0.6\mu$ (FIG. 5).

EXAMPLE 5

Preparation of Microspheres Wherein the Starting Polymer is an Ester of Alginic Acid (ALAFF)

A derivative of alginic acid, wherein all the carboxy groups of alginic acid are esterified with benzyl alcohol, is dissolved in an aprotic solvent, such as dimethylsulfoxide (DMSO), at a concentration varying between 0.1 and 5% in weight, generally 1% w/w. The procedure described in Example 1 is then performed. The mean particle size is $0.8\mu$ (FIG. 6).

EXAMPLE 6

Preparation of Microspheres Wherein the Starting Polymer is an Ester of Pectinic Acid A derivative of pectinic acid, wherein all the carboxy groups are esterified with benzyl alcohol, is dissolved in an aprotic solvent, such as dimethylsulfoxide (DMSO), at a concentration varying between 0.1 and 5% in weight, generally 1% w/w. The procedure described in Example 1 is then performed.

The mean particle size is $0.7\mu$.

EXAMPLE 7

Preparation of Microspheres Wherein the Starting Polymer is HYAFF-11 (Benzyl Ester of Hyaluronic Acid) and Which are Loaded With Calcitonin A hyaluronic acid ester, wherein all the carboxy groups of hyaluronic acid are esterified with benzyl alcohol, is dissolved in an aprotic solvent such as dimethylsulfoxide (DMSO), at a concentration varying between 0.1% and 5% in weight, generally 1% w/w. Once the polymer has reached solubilization, the calcitonin is added to the polymeric solution at the set concentration, eg 1.5I.U. per mg of polymer. The solution thus obtained is poured into a pressure-proof vessel (precipitator), thermostatically controlled by a heated ethylene glycol jacket. Porous steel filters with a cut-off of $0.1\mu$ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base. This antisolvent, which is first gaseous and then supercritical, can be mixed perfectly with the liquid solvent (DMSO) but it is a nonsolvent for the polymer and the polypeptide calcitonin.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 0.5μ. The quantity of incorporated calcitonin is 1.3 I.U. per mg of microspheres.

EXAMPLE 8

Preparation of Microspheres wherein the Starting Polymer is HYAFF-7 p75 (Benzyl Ester of Hyaluronic Acid) and Which are Loaded with Calcitonin A hyaluronic acid ester, wherein 75% of the carboxy groups of hyaluronic acid are esterified with benzyl alcohol, while the remaining part is salified with sodium, is dissolved in an aprotic solvent such as dimethylsulfoxide (DMSO), at a concentration varying between 0.1 and 5% in weight, generally 1% w/w. Once the polymer has reached solubilization, calcitonin is added to the polymeric solution at a set concentration, eg 1.0 I.U. per mg of polymer.

The solution thus obtained is poured into a pressure-proof vessel (precipitator), thermostatically controlled by a heated ethylene glycol jacket. Porous steel filters with a cut-off of 0.1 μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous filter. This antisolvent, which is first gaseous and then supercritical, can be mixed perfectly with the liquid solvent (DMSO) but it is a nonsolvent for the polymer and the polypeptide calcitonin.

The loading rate, or the pressure gradient over time, is set in a range of 3–20 bar/min, preferably 10 bar/min. The temperature in the precipitator is kept constant in a range of between 25° C. and 60° C. preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is (depressurized at a rate of 5 bar/min. The vessel is opened, the microspheres are collected and placed in suitable containers where they are stored at 4° C. The yield of microspheres is almost total.

There is no appreciable incorporation of solvent in the precipitate. The DMSO is collected in the expansion container.

The mean particle size in these working conditions is 0.8 μ. The quantity of incorporated calcitonin is 0.9 I.U. per mg of microspheres.

EXAMPLE 9

Preparation of Microspheres wherein the Starting Polymer is HYAFF-7 (Ethyl Ester) of Hyaluronic Acid, and which are Loaded with Calcitonin A hyaluronic acid ester, wherein all the carboxy groups of hyaluronic acid are esterified with ethyl alcohol, is dissolved in an aprotic solvent such as dimethylsulfoxide (DMSO), at a concentration varying between 0.1 and 5% in weight, generally 1% w/w. Once the polymer has reached solubilization, calcitonin is added to the polymeric solution at a set concentration, eg 15 I.U. per mg of polymer.

The solution thus obtained is poured into a pressure-proof vessel (precipitator), thermostatically controlled by a heated ethylene glycol jacket. Porous steel filters with a cut-off of 0.1 μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base, This antisolvent, which is first gaseous and then supercritical, can be mixed perfectly with the liquid solvent (DMSO) but it is a nonsolvent for the polymer and the polypeptide e calcitonin.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and bottom of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

EXAMPLE 10

Preparation of Microspheres Wherein the Starting Polymer is HYAFF-11 (Benzyl Ester of Hyaluronic Acid), and Which Contain GMCSF (Granulocyte Macrophage Colony Stimulating Factor)

A hyaluronic acid ester, wherein all the carboxy groups of hyaluronic acid are esterified with benzyl alcohol, is dissolved in an aprotic solvent such as dimethylsulfoxide (DMSO), at a concentration which varies between 0.1 and 5% in weight, generally 1% w/w. Once the polymer has reached solubilization. GMCSF is added to the polymer solution at a set concentration, eg 1% of the polymer mass.

The solution thus obtained is poured into a pressure-proof vessel (precipitator), thermostatically controlled by a heated ethylene glycol jacket. Porous steel filters with a cut-off of 0.1μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base. This antisolvent, which is first gaseous and then supercritical, can be mixed perfectly with the liquid solvent (DMSO) but it is a nonsolvent for the polymer and the polypeptide GMCSF.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 0.5μ. The quantity of incorporated GMCSF is 9 μg. per mg of microspheres.

EXAMPLE 11

Preparation of Microspheres Wherein the Starting Polymer is HYAFF-11 p75 (Benzyl Ester of Hyaluronic Acid), and which Contain GMCSF (Granulocyte Macrophage Colony Stimulating Factor)

A hyaluronic acid ester, wherein 75% of the carboxy groups of hyaluronic acid are esterified with benzyl alcohol while the remaining part is salified with sodium, is dissolved in an aprotic solvent such as dimethylsulfoxide (DMSO), at a concentration varying between 0.1 and 5% in weight, generally 1% w/w. Once the polymer has reached solubilization, GMCSF is added to the polymeric solution at a set concentration, eg 2% of the polymer mass.

The solution thus obtained is poured into a pressure-proof vessel (precipitator), thermostatically controlled by a heated ethylene glycol jacket. Porous steel filters with a cut-off of 0.1 μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base. This antisolvent, which is first gaseous and then supercritical, can be mixed perfectly with the liquid solvent (DMSO) but it is a nonsolvent for the polymer and the polypeptide GMCSF.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and base of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 0.8μ. The quantity of incorporated GMCSF is 17 μg per mg of microspheres.

EXAMPLE 12

Preparation of Microspheres Wherein the Starting Polymer is HYAFF-7 (Ethyl Ester of Hyaluronic Acid), and Which are Loaded with GMCSF (Granulocyte Macrophage Colony Stimulating Factor)

A hyaluronic acid ester, wherein all the carboxy groups of hyaluronic acid are esterified with ethyl alcohol, is dissolved in an aprotic solvent such as dimethylsulfoxide (DMSO), at a concentration varying between 0.1 and 5% in weight, generally 1% w/w. Once the polymer has reached solubilization. GMCSF is added to the polymeric solution at a set concentration, eg 0.1% of the polymer mass.

The solution thus obtained is poured into a pressure-proof vessel (precipitator), thermostatically controlled by a heated ethylene glycol jacket. Porous steel filters with a cut-off of 0.1μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, generally 100 bar). The $CO_2$ is distributed in the solution through the porous base. This antisolvent, which is first gaseous and then supercritical, can be mixed perfectly with the liquid solvent (DMSO) but it is a nonsolvent for the polymer and the polypeptide GMCSF.

The loading rate, or the pressure gradient over time, is set in a range of 3–20 bar/min, preferably 10 bar/min. The temperature in the precipitator is kept constant in a range of between 25° C. and 60° C., preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and bottom of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 1.0μ. The quantity of incorporated GMCSF is 0.9 μg per mg of microspheres.

EXAMPLE 13

Preparation of Microspheres Wherein the Starting Polymer is HYAFF-11 (Benzyl Ester of Hyaluronic Acid), and Which are Loaded with Human Insulin A hyaluronic acid ester, wherein all the carboxy groups of hyaluronic acid are esterified with benzyl alcohol, is dissolved in an aprotic solvent such as dimethylsulfoxide (DMSO), at a concentration varying between 0.1 and 5% in weight, generally 1% w/w. Once the polymer has reached solubilization, human insulin is added to the polymeric solution at a set concentration, eg 5 I.U. per mg of polymer.

The solution thus obtained is poured into a pressure-proof vessel (precipitator), thermostatically controlled by a heated ethylene glycol jacket. Porous steel filters with a cut-off of 0.1μ are screwed onto the top and base of the precipitator. The liquid is unable to seep through by gravity alone.

Once the vessel is closed, it is loaded from underneath with hyperpure carbon dioxide ($CO_2$) until the working pressure is reached (80–120 bar, preferably 100 bar). The $CO_2$ is distributed in the solution through the porous base. This antisolvent, which is first gaseous and then supercritical, can be mixed perfectly with the liquid solvent (DMSO) but it is a nonsolvent for the polymer and the polypeptide human insulin.

The loading rate, or the pressure gradient over time, is set in a range of 3–20 bar/min, preferably 10 bar/min. The temperature in the precipitator is kept constant in a range of between 25° C. and 60° C. preferably 40° C.

When the working pressure has been reached, the flow of $CO_2$ is switched off for 10 minutes to obtain the desired pressure and temperature conditions inside the precipitator. The washing operation is begun by supplying antisolvent to the precipitator and regulating the outlet flow from the top of the precipitator by means of a millimetric valve.

The outlet fluid, constituted by antisolvent and DMSO, is directed towards the DMSO collector, which is kept at room pressure; the DMSO separates after expansion and consequent cooling, while the gaseous $CO_2$ comes out of the top of the vessel and is released into the atmosphere. The solid particles, on the other hand, are trapped by the porous filters at the top and bottom of the precipitator.

The operation is continued to allow the DMSO to be completely removed from the precipitator. The time it takes for the organic solvent to be removed by the supercritical antisolvent depends on the temperature in the precipitation chamber, when fixed amount of liquid solution and antisolvent flow rate are set up.

At the end of washing, the supply of $CO_2$ is cut off and the vessel is depressurized at a rate of 5 bar/min. The vessel is opened, the microspheres are collected and placed in suitable containers where they are stored at 4° C. The yield of microspheres is almost total. There is no appreciable incorporation of solvent in the precipitate. The DMSO is collected in the expansion container.

The mean particle size in these working conditions is 0.8μ. The quantity of incorporated insulin is 5 I.U. per mg of microspheres.

EXAMPLE 14

Surface Loading of Microspheres of HYAFF-11 (Benzyl Ester of Hyaluronic Acid) with Calcitonin by Lyophilization Microspheres prepared according to Example 1 are suspended in a solution of 0.01 M phosphate buffer, containing calcitonin in a concentration which gives a protein titer of 1 I.U. per mg of suspended microspheres. After 15 minutes' shaking with a semiautomatic device, the container is immersed in liquid nitrogen until the suspension is completely frozen.

Once frozen, the container is lyophilized for 24 hours, after which the lyophilized product is stored at 4° C.

The mean particle size in these working conditions is 0.4 μ. The quantity of incorporated calcitonin is 1 I.U. per mg of microspheres.

EXAMPLE 15

Surface loading of microspheres of HYAFF-11 p75 (benzyl ester of hyaluronic acid) with calcitonin by lyophilization Microspheres prepared according to Example 2 are suspended in a solution of 0.01 M phosphate buffer, containing calcitonin in a concentration which gives a protein titer of 1.5 I.U. per mg of suspended microspheres. After 15 minutes' stirring with a semiautomatic device, the container is immersed in liquid nitrogen until the suspension is completely frozen.

Once frozen, the container is lyophilized for 24 hours, after which the lyophilized product is stored at 4° C.

The mean particle size in these working conditions is 0.6 μ. The quantity of incorporated calcitonin is 1.5 I.U. per mg of microspheres.

What is claimed is:

1. Biocompatible and biodegradable three-dimensional structures in the form of sponges, gels, fibres, threads, tubes, non-woven fabrics, cords, or meshes, consisting essentially of at least one hyaluronic acid derivative, obtained by a process of precipitation induced by supercritical antisolvent, optionally in association with pharmacologically or biologically active substances and/or other natural, semisynthetic and synthetic polymers.

2. Three-dimensional structures according to claim 1, wherein the hyaluronic acid derivative is selected in the group consisting of:
   (i) esters of hyaluronic acid wherein part or all of the carboxy functions are esterified with alcohols of the aliphatic, aromatic, arylaliphatic, cycloaliphatic, or heterocyclic series;
   (ii) esters of hyaluronic acid wherein the first part of the carboxy functions is esterified with araliphatic alcohol and the second part with straight, long-chained aliphatic alcohols with between 10 and 22 carbon atoms;
   (iii) autocrosslinked esters of hyaluronic acid wherein part or all of the carboxy groups are esterified with the alcoholic functions of the same polysaccharide chain or of other chains;
   (iv) crosslinked compounds of hyaluronic acid wherein part or all of the carboxy groups are esterified with polyalcohols of the aliphatic, aromatic, arylaliphatic, cycloaliphatic, or heterocyclic series, generating crosslinking by means of spacer chains;
   (v) hemiesters of succinic acid or heavy metal salts of succinic acid with hyaluronic acid or with partial or total esters of hyaluronic acid;
   (vi) sulfated or N-sulfated derivatives; and
   (vii) amide derivatives of hyaluronic acid.

3. Three-dimensional structures according to any one of claims 1–2, wherein the partial ester derivatives of hyaluronic acid have less than 90% esterification.

4. Three-dimensional structures according to any one of claims 1 and 2, wherein the derivatives of hyaluronic acid are esterified with benzyl alcohol.

5. Three-dimensional structures according to claim 1, wherein the natural polymers are selected from the group consisting of collagen, coprecipitates of collagen and glycosaminoglycans, cellulose, polysaccharides in the form of gel, chitosan, pectin or pectic acid, agar, agarose, xanthan, gellan, alginic acid or alginates, polymannan or polyglycans, starch, and natural gums.

6. Three-dimensional structures according to claim 1, wherein the semisynthetic polymers are selected from the group consisting of collagen crosslinked with an agent selected from the group consisting of aldehydes and precursors thereof, dicarboxylic acids or halides thereof, diamines, derivatives of cellulose, hyaluronic acid, chitin or chitosan, gellan, xanthan, pectin or pectic acid, polyglycans, polymannan, agar, agarose, natural gum, and glycosaminoglycans.

7. Three-dimensional structures according to claim 1, wherein the synthetic polymers are selected from the group consisting of polylactic acid, polyglycolic acids, copolymers or derivatives thereof, polydioxanes, polyphosphazenes, polysulphonic resins, polyurethanes, and polytetrafluoroethylene (PTFE).

8. Three-dimensional structures according to claim 1, wherein the pharmaceutically or biologically active substances are selected from the group consisting of anti-inflammatory agents, antibiotics, and growth factors.

9. A discontinuous process for the preparation of sponges containing at least one hyaluronic acid derivative, said process comprising the following steps:
   a) dissolving the hyaluronic acid derivative in an aprotic solvent at a concentration of between 2% w/w and saturation at a temperature of 40° C., said concentration being selected so as to exceed the concentration threshold when the hyaluronic acid derivative is present in a network structure;
   b) loading the solution from step a) into a pressure-resistant container;
   c) loading an antisolvent until a pressure greater than that of precipitation is reached at a temperature of between 10 and 70° C.;
   d) removing the aprotic solvent with the flow of antisolvent; and
   e) depressurizing the container and harvesting the precipitate.

10. A continuous process for the preparation of threads comprising at least one hyaluronic acid derivative, said process including the following steps:
   a) dissolving the hyaluronic acid derivative in an aprotic solvent at a concentration between 2% w/w and saturation at a temperature of 40° C., said concentration being selected so as to exceed the concentration threshold when the hyaluronic acid derivative is present in a network structure;
   b) loading the solution into a thermostatic, pressure-resistant container;
   c) loading an antisolvent until a pressure greater than that of precipitation is reached, at a temperature of between 10 and 70° C. and stabilizing the flow of antisolvent;
   d) injecting continuously the solution of hyaluronic acid derivative into a precipitator through a calibrated opening set at a diameter of between 40 and 400 micron;
   e) interrupting injection of the solution;
   f) removing any residue solvent with the flow of antisolvent; and
   g) depressurizing the precipitator and harvesting the precipitate.

11. The process according to any one of claims 9 and 10, wherein the antisolvent is selected from the group consisting of carbon dioxide, hydrocarbons, hydrofluorocarbons, and nitrous oxide.

12. The process according to claim 9, wherein the antisolvent is loaded at a speed or pressure gradient of 0.1 to 20 bar/min, until a pressure of 40 to 150 bars is reached.

13. The process according to any one of claims 9 and 10, wherein the aprotic solvent used in step a) to dissolve the hyaluronic acid derivative is chosen from the group consisting of dimethylsulfoxide, N-methylpyrrolidone, and dimethylformamide.

14. The process according to any one of claims 9 and 10, wherein the hyaluronic acid derivative is selected from the group consisting of (i) esters of hyaluronic acid, (ii)

autocrosslinked derivatives of hyaluronic acid or derivatives of hyaluronic acid that are crosslinked by means of spacer chains, (iii) hemiesters of succinic acid or heavy metal salts of the hemiester of succinic acid with hyaluronic acid or partial or total esters of hyaluronic, (iv) sulfated or N-sulfated derivatives, and (v) amide derivatives of hyaluronic acid.

15. The process according to claim 9, wherein pharmacologically and biologically active compounds are added during step a) after dissolving the hyaluronic acid derivative in the aprotic solvent.

16. The process according to claim 10, wherein pharmacologically and biologically active substances are added in step a) after dissolving the hyaluronic acid derivative in the aprotic solvent.

17. Three-dimensional structures according to claim 3, wherein the partial ester derivatives of hyaluronic acid have between 45 to 75% esterification.

18. Three-dimensional structures according to claim 3, wherein the partial ester derivatives of hyaluronic acid have between 60 to 70% esterification.

19. Three-dimensional structures according to claim 5, wherein the gel is chitin.

20. Three-dimensional structures according to claim 8, wherein said growth factors are bone morphogenic protein (BMP), human Nerve Growth Factor (hNGF), or Ciliary Neuronotrophic Factor (CNTF).

* * * * *